Apr. 24, 1923.
D. M. WEIGEL
1,453,217
PNEUMATIC TIRE
Filed Aug. 22, 1921
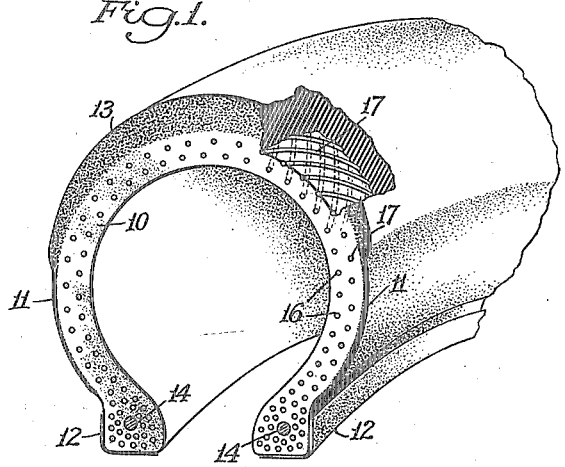
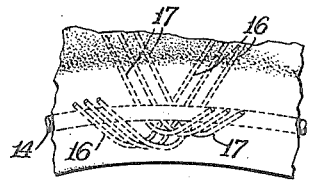
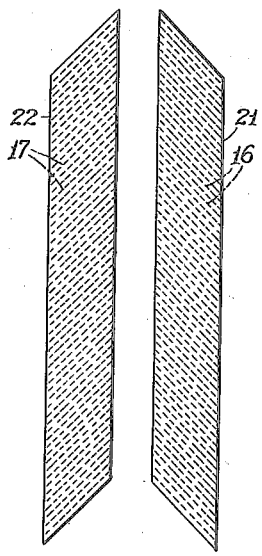
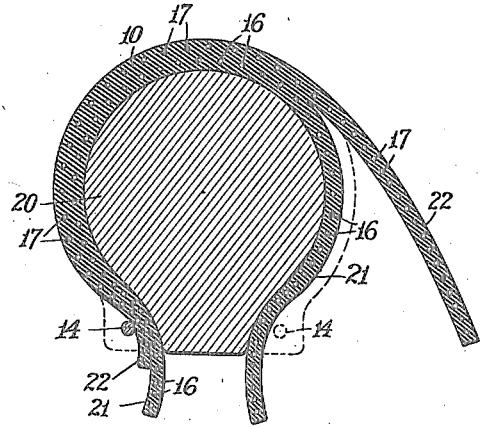
INVENTOR
D. M. Weigel
BY his
Kerr Page Cooper & Hayward
ATTORNEYS Patented Apr. 24, 1923.

1,453,217

UNITED STATES PATENT OFFICE.

DANIEL M. WEIGEL, OF CHICAGO, ILLINOIS, ASSIGNOR TO THE WIRE CORD COMPANY, OF AKRON, OHIO, A CORPORATION OF DELAWARE.

PNEUMATIC TIRE.

Application filed August 22, 1921. Serial No. 494,089.

*To all whom it may concern:*

Be it known that I, DANIEL M. WEIGEL, a subject of the King of Great Britain, residing at Chicago, in the county of Cook and State of Illinois, have invented certain new and useful Improvements in Pneumatic Tires, of which the following is a full, clear, and exact description.

The present invention is directed to improvements in tires and has for its principal object the provision of a tire which will not be subject to the disadvantages of the tires now in use.

Pneumatic tire casings as now used usually comprise a carcass and a covering therefor. The carcass constitutes the flexible load carrying and strain resisting structure. The covering, on the other hand, merely serves as a protection for the carcass. The carcasses used heretofore have generally been composed of canvas, cord or other vegetable fiber, and hence are subject to rotting or other deterioration when in use.

In all such tires, it is difficult to secure a firm bond or junction between the component parts of the carcass proper and the rubber covering; it is found that there is eventual separation of these parts after the tire has been in use.

Various attempts have been made to use flexible wires in the manufacture of tire casings, but in all these proposed constructions certain disadvantages have arisen which have made such tires uncommercial and unsatisfactory.

One object of the present invention is to provide a construction in which vegetable fabric such as cords or canvas may be entirely eliminated from the carcass and load carrying structure. In lieu thereof I provide a carcass in which the internal air pressure is resisted wholly by flexible metallic wires and the rubber of the body portion, said wires acting solely to take the loads and strains imposed upon the carcass when in use.

Other objects of the invention reside in the provision of a wire and rubber tire of such type that the whole will be highly flexible and one that will not be subject to internal friction between adjacent load-carrying wires.

Another object of the present invention resides in the provision of a construction in which a plurality of layers of wires may be used without the wires of one layer contacting with the adjacent layer or layers.

Other objects reside in the provision of a tire which, when completed, is formed of a homogeneous mass of rubber and metallic wires and one in which each wire may flex independently of the other wires, and in which the flexing of the wires will be localized within the region subjected to flexure. Otherwise stated, one object is to provide a tire having load-carrying wires in which the minimum of movement is transmitted from wire to wire or to any other portion of the body when a certain part of the casing or a certain wire or wires is subject to flexure.

It may be pointed out that a tire made in accordance with my invention has no interlocking connections between adjacent wires nor are wires supplementary to canvas fabrics which have been used to form the carcass. The present invention is directed to a construction which provides for complete freedom of movement of the wires unimpeded by any connection with adjacent wires or by associated contacting supplementary reinforcing fabric.

Other objects and advantages of my tire will be further set forth in the accompanying specification and claims and shown in the drawings, which illustrate by way of exemplification one embodiment of my invention.

In the drawings,

Fig. 1 shows a perspective sectional view of my tire with certain parts broken away to show the interior construction.

Fig. 2 is a side view of one form of bead showing the interlocking of the load carrying wires with the bead.

Fig. 3 shows a diagrammatic view of a pair of rubber and wire strips which are used in building up the tire.

Fig. 4 shows a sectional view of a core or mandrel with one strip placed in position tion and stitched down, and a second strip being applied.

Broadly, the carcass which forms the subject matter of the present invention comprises a body portion of rubber having the usual beads at the edges. Within the rubber body portion are embedded suitable flexible metallic load carrying wires, preferably stranded, which extend preferably diagonally, from bead to bead. Each wire is independent of the other and adjacent wires, and is separated therefrom by the rubber of the body portion. The wires are preferably disposed in one or more layers with the wires of the different layers crossing each other, with the rubber of the body portion disposed therebetween, so as to form an unwoven mesh in the completed tire. The spacing of the wires is such that the intervening rubber cannot be stretched sufficiently to permit the air pressure to rupture the casing.

In the drawings, 10 designates the rubber body portion of the carcass, 11 the side walls, 12 the rim-engaging portions, and 13 the tread. Within the rubber rim engaging portions are the beads or equivalent parts 14. These parts may be formed in a variety of ways, as will be apparent to those skilled in the art. In the present embodiment, for clearness of illustration, I have shown them as wire strands. It is needless to state that they may be of hard rubber or may be made of a multiplicity of strands without departing from my invention. Anchored in any suitable manner to the beads are the load carrying wires 16. The individual wires extend diagonally from bead to bead or at an angle thereto (see Fig. 1). In this figure the anchorage between the beads and load carrying wires is preferably formed by bending over the latter so that they interlock.

Superimposed over the wires 16 and spaced therefrom by the rubber of the body portion 10 are similar wires 17. These wires are likewise anchored to the beads and are at an angle thereto. They form with the wires 16 a sort of mesh, the interstices of which are of such size that the rubber body portion is sufficiently strong to prevent undue stretching or rupture thereof by the contained air. In practise a single or a plurality of layers of load carrying wires may be employed. The spacing of the wires will depend upon the air pressure, size of tire, number of layers of wire employed, thickness and construction of inner tube, etc.

The tire above described may be formed in a variety of ways, and I do not limit the present invention to any particular method of construction. However, in order to bring out clearly the structural characteristics of the completed tire, one method of making the same will be herein set forth.

The tire may be built up upon the usual core or mandrel 20. A strip of plastic rubber 21, preferably made of two united sheets with one layer of diagonally disposed load carrying wires disposed therebetween, is laid up upon the core and stitched down thereon in the usual way to conform to the configuration of the core. During the stitching down of the strip the load carrying wires may be displaced slightly in the plastic rubber material, approaching one another near the bead and increasing in their interval at the periphery, thus allowing the wires to assume the varying curvature of the core. Upon the first strip may be laid a second strip 22 of like material, but having the wires 17 disposed so as to cross the wires 16 of the other strip. This strip 22 is stitched down upon the other strip 21 forming a unitary rubber mass therewith. Any desired number of strips may be thus applied. Thereafter the beads, which are preferably of metal, are placed in position. These beads 14, however, may be of hard rubber or any other material as commonly used in bead construction. The bead portions of the casing may be of the straight side, clincher, or any other type as desired.

The edges of the strips are now bent about the beads, causing the ends of the wires 16 and 17 to interlock as shown in Fig. 2. The specific arrangement of beads and the particular method of joining the strips and wires thereto is immaterial. It is only essential that the load carrying wires may be anchored in some manner to the beads.

The next step in construction consists in the application of the side walls 11 and the tread 13, which may be effected in any suitable manner. Finally, the whole tire is vulcanized in any desired way.

When it is desired to strengthen the rubber body portion of the carcass for any reason, such as to pemit wider spacing of the wires, I may intimately mix with the plastic rubber during the process of milling short lengths of cotton yarn, cotton waste, cotton wool, or like material. By using these short lengths of yarn the principle of my invention is not departed from, since when the tire is completed the yarn does not support the load and resist strains from bead to bead, but merely gives support as between adjacent wires, thereby decreasing the tendency of the rubber to rupture under internal air pressure at such points. This admixture of material with the rubber does not impair the elasticity of the rubber and the independent motion of the wires.

The finished tire comprises a carcass composed of a homogeneous mass of rubber from inside to outside. Embedded in the rubber are the load-carrying and strain resisting wires which extend obliquely from bead to bead and are anchored thereto. Each wire is separated from the other wires by the rubber of the body portion. The wires themselves coacting with the rubber form a structure which itself is sufficiently strong to resist rupture due to the pressure of the contained air. The wires being independent of each other, except at the bead portions, do not abrade or rub each other, nor do they impede the free and localized flexing of the tire when in use.

The tire when vulcanized is a homogeneous article, and there is no tendency for a separation of any component parts thereof as with tires having a vegetable fiber carcass and a rubber covering. There is no heating, and deterioration due to rotting is obviated. The tire has high flexibility and efficiency and long life. Furthermore, the cost of making the same is low, and tires may be built stronger to withstand higher air pressures than heretofore without decreasing the flexibility or efficiency materially.

This application is a continuation in part of my copending application Serial No. 367,087, filed March 19, 1920.

I claim:

1. In a pneumatic tire, a carcass having a rubber body portion including bead portions, spaced wires embedded therein extending from bead to bead and being independent of each other throughout their length except at the point of fastening in the bead portion, said rubber body portion and said wires in themselves solely constituting the means for resisting the tendency of the contained air to rupture the tire.

2. In a pneumatic tire, a carcass having a rubber body portion, beads, and a plurality of wires diagonally disposed from bead to bead and anchored thereto, each wire being independent of each other and separated from adjacent wires by the rubber of the body portion, said wires themselves constituting the sole strain-resisting medium from bead to bead.

3. In a pneumatic tire, a strain-resisting carcass adapted to assume all the loads and strains from bead to bead and comprising a rubber body portion, beads, and a plurality of layers of independent wires extending diagonally to and anchored to said beads, the wires of one layer being oppositely disposed relatively to the wires of the other layer, the layers thereby forming a mesh, said wires being all separated from each other by the rubber of the body portion and being maintained in spaced relation thereby when the tire is vulcanized.

4. In a pneumatic tire, a carcass having a rubber body portion, beads, and a plurality of wires anchored to the beads, said wires being disposed in a plurality of layers, each individual wire being separated from the adjacent wires of the same and other layers by the rubber of the body portion, whereby said wires may flex independently without heating or abrading the other wires, said wires themselves solely constituting the means for resisting strains from bead to bead.

5. The invention set forth in claim 4 in which the wires and the rubber of the body portion solely constitute the means for resisting the tendency of the contained air to rupture the casing.

6. In a pneumatic tire, a carcass comprised solely of rubber with wires and beads embedded therein, said wires extending diagonally to and individually anchored to the beads, each wire floating in rubber and being separated from the other wires by said rubber, whereby each wire may move independently of the other wires and whereby each wire may move within the rubber without imparting friction to or heating the other wires, said wires and rubber being adapted to take the whole strain of the internal pressure of the tire.

7. In a pneumatic tire, a carcass adapted to sustain pressure of the contained air by means permitting the elimination of vegetable load carrying members, said carcass comprising a rubber body portion having beads and having wire elements embedded therein, said elements comprising a plurality of independent wires each separated by rubber and disposed diagonally to the beads and anchored thereto, and a second plurality of wires disposed above the first mentioned wires and crossing the same to form a mesh, said mesh having the interstices thereof filled with rubber, and being of such size as to prevent the blowing out of the tire under the pressure of the contained air, each of the aforesaid wires floating in the rubber of the body portion so as to be movable therein independently of all of the other wires therein.

8. A pneumatic casing comprising a carcass and rubber tread and side-wall portions, said carcass having beads and a plurality of independent wires and a rubber body portion united homogeneously with the rubber tread and side-wall portions, said wires extending from bead to bead and anchored thereto, said wires being independent of and separated from each other throughout their length except at the beads by the rubber of the carcass body portion, and said wires being adapted to in themselves assume the entire strain from bead to bead.

9. A pneumatic tire casing comprising rubber tread and side-wall portions, and a carcass having a rubber body portion homogenously united with the rubber tread and side wall portions to form an integral and unitary whole, said carcass also having beads and a plurality of layers of wires anchored to said beads and otherwise independent of each other throughout their length, said rubber body portion of the carcass separating and spacing the adjacent wires of the same and other layers from each other whereby they may freely flex independently of each other without abrading or heating, said wires themselves constituting the sole means for resisting the strains transmitted to the bead portions of the casing.

In testimony whereof I hereto affix my signature.

DANIEL M. WEIGEL.